Nov. 18, 1941.  H. G. ROGERS  2,263,249

LIGHT-POLARIZING LAMINATION AND PROCESS OF MANUFACTURE

Filed Sept. 18, 1939

INVENTOR.
Howard G. Rogers
BY
Brown & Jones
ATTORNEYS

Patented Nov. 18, 1941

2,263,249

UNITED STATES PATENT OFFICE 2,263,249

LIGHT-POLARIZING LAMINATION AND PROCESS OF MANUFACTURE

Howard G. Rogers, West Newton, Mass., assignor to Polaroid Corporation, Dover, Del., a corporation of Delaware Application September 18, 1939, Serial No. 295,417

15 Claims. (Cl. 88—65)

This invention relates to a new and improved laminated light polarizer and to a method of manufacturing the same.

An object of the invention is to provide a lamination of light-polarizing material of the type disclosed in the copending application of Land and Rogers, Serial No. 271,814, filed May 4, 1939, now Patent No. 2,173,304, and more specifically a lamination of light-polarizing material comprising a sheet of polyvinyl alcohol containing oriented molecules of polyvinylene to a sheet of glass.

Other objects of the invention are to provide a shatter-resistant lamination between two sheets of glass of the said light-polarizing material; to provide such laminations employing either curved or flat glass supporting plates; to provide such laminations where the sheet of light-polarizing material is in direct contact with the supporting plate; to provide such laminations wherein the sheet of light-polarizing material is bonded to the supporting plate by a thin layer of polyvinyl alcohol; and to provide a lamination of the character described wherein one surface of the sheet of light-polarizing material is bonded to a supporting plate and the other surface is coated with a protective resin.

Other objects of the invention are to provide a process for the formation of a light-polarizer from a sheet of molecularly oriented polyvinyl alcohol bonded directly to a supporting plate, such as glass, and to provide a process for the lamination of a pre-formed light-polarizing material comprising oriented polyvinylene to one or more supporting plates, for example sheets of glass, which may be flat or curved.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

For a fuller understanding of the invention, reference should be had to the accompanying drawing, in which.

In the said copending application of Land and Rogers, Serial No. 271,814, there is disclosed a light-polarizer comprising a sheet of a vinylic resin, such for example as polyvinyl alcohol, which has been subjected to a heat treatment and an extension so that there is formed within the sheet a multiplicity of molecules of a dichroic alteration product of polyvinyl alcohol called "polyvinylene." These molecules are oriented to substantial parallelism. They are hydrocarbon, long, straight chain molecules having extended systems of conjugated double bonds.

Light-polarizers of the type described in the said copending application may be produced by casting sheets or films of polyvinyl alcohol or polyvinyl acetal, by preferably treating the sheets with a dilute solution of an acid, such as sulphuric acid, by heating the sheets, for example to a temperature of approximately 175° C., and by stretching the sheets to substantially orient their molecules, for example by stretching the sheets to approximately eight times their original length. When the stretched sheets are hardened, they are excellent light-polarizers.

Figure 3:
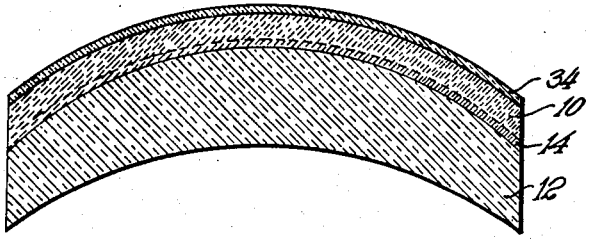
Fig. 3 is a view similar to Fig. 1 of a still further modification of the invention.

This invention contemplates the production of a lamination comprising a rigid supporting plate, such as glass, to which the said light-polarizing material is bonded. In one form of the invention, for example that shown in Figs. 1 and 3, the light-polarizing material 10 is bonded to the supporting plate 12 on one surface only, the opposite surface of the light-polarizing material remaining uncoated, or, as is shown in Fig. 3, being coated with a protective resin 34.

Figure 1:
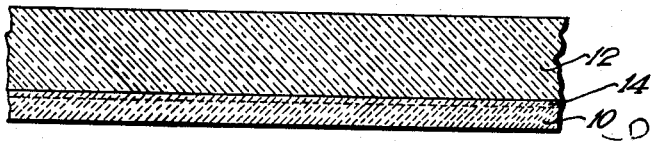
Figure 1 illustrates diagrammatically a sectional view of one form of the invention.

The light-polarizing material comprising oriented molecules of polyvinylene in polvinyl alcohol does not adhere readily directly to glass after the polarizing material has once been formed. In one embodiment of the invention means are provided for effecting a satisfactory bond between the polarizer and the glass support by the provision of a supplemental bonding layer of a suitable adhesive or cement. Such a structure is shown, for example, in Fig. 1, where the light-polarizer 10 is bonded to the support 12 by an intermediate layer of polyvinyl alcohol 14 which is free from the molecules of polyvinylene. As shown in Fig. 1, the support may be a sheet providing a flat, smooth surface, or as shown in Fig. 3 the support may be curved, and the surface to which the light-polarizing material 10 is affixed may be either convex or concave.

In the preparation of the lamination, the glass supporting sheet 12 is preferably first coated with a thin layer of a solution of polyvinyl alcohol in water. This solution may be in the form of a 10% solution, and it may be sprayed or otherwise smoothly applied to the glass surface. The polyvinyl alcohol solution may then be dried before the light-polarizing layer is brought into contact with it, or the light-polarizer may be brought into contact with the coating of polyvinyl alcohol while it is still wet. If the coating has been permitted to dry, the contacting surfaces of the coating and the polarizing sheet should be moistened when they are brought together. This may be accomplished either by placing a few drops of water on the surface of the polyvinyl alcohol coating, or by soaking the light-polarizing film in, for example, an aqueous solution of sodium chloride, which shrinks the film. The shrunken film may then be re-stretched to its original size if desired, and while still wet brought into contact with the coating of polyvinyl alcohol.

The polarizing film will conform to the shape of the coated support, and should be held in contact therewith until both the film and the adhesive layer have dried. Preferably sufficient pressure is maintained between the polarizer and the coated support during drying to insure uniform contact and freedom from bubbles, wrinkles and the like.

Drying may be accomplished by heating the lamination to, for example, 220° F. for a period of about thirty minutes. When so treated the polarizing layer is found to adhere firmly to the glass support, the film of polyvinyl alcohol acting as the adhesive.

Heating at a still higher temperature, for example a temperature of approximately 350° F., for a period of about thirty minutes renders the adhesive layer of polyvinyl alcohol substantially impervious to water.

The shrinking treatment above described, in which the polarizing film is treated with an aqueous solution of sodium chloride, is of aid in inhibiting discoloration of the film after lamination.

The support with the coated film of polyvinyl alcohol may be heated prior to the formation of the lamination, for example to a temperature of around 120° C., and the moistened polarizing film brought into contact with the coated support in the manner previously described, or contact may be effected before heating is applied to dry the lamination.

Figure 2:
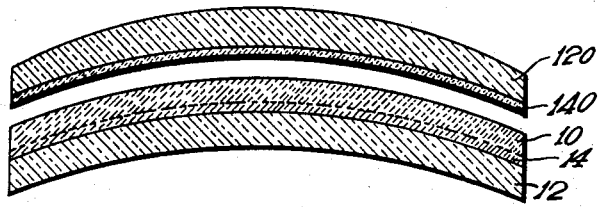
Fig. 2 is an exploded view in section of another form of the invention.

It will of course be understood that a supporting element, such as the glass sheet 12, may be affixed to each surface of the light-polarizing element 10 in the manner previously described. In Fig. 2, for example, there is shown a view in which a complete lamination of light-polarizing material, cement and glass support is about to have affixed to it a second glass support 120 coated with an adhesive layer of polyvinyl alcohol 140. The finished lamination would comprise the two transparent supporting plates 12, 120, the two adhesive layers 14, 140, and the light-polarizing layer 10.

Where the lamination comprises only a single glass sheet, as for example in the device shown in Fig. 3, it is desirable to coat the exposed surface of the light-polarizing layer 10 with a resin, and more particularly a resin adapted to provide a hard, tough coating 34. A suitable material for use in this connection is the urea type resin sold commercially under the trade-mark name "Polymerin," a product of Ault & Wiborg Corporation. This resin, thinned with Polymerin thinner, may be sprayed on to the exposed surface of the polarizing layer 10 and the lamination then heated to a temperature in excess of 300° F. for a sufficient time to render the coating hard but not brittle. Such a coated polarizing lamination is admirably adapted for use under conditions in which the coated surface is exposed to rough usage. For example, the exposed outer surface of an automobile headlight lens may be coated with the polyvinyl alcohol-polyvinylene polarizer in the manner heretofore described, and the polarizer then may be protected by the addition of the hard, tough resin coating.

If desired the resin coating may comprise material adapted to block ultraviolet radiation. A suitable ultraviolet absorber for use when Polymerin is employed as a coating is the material sold under the trade name "Beckacite 1001," which can be added to the Polymerin in any desired quantity up to about 30% by weight of the unthinned Polymerin solution. If the lamination of the type shown in Fig. 2 is effected with heat-resistant glass of the Pyrex type, or if the outer layer of the lamination comprises, for example, window glass, no further ultraviolet absorber need be employed.

It will be understood that the desired lamination may be effected by employing modifications of the process already described. For example, a small quantity of wet polyvinyl alcohol may be placed upon the glass support and the polarizing layer may be pressed upon the polyvinyl alcohol, causing it to spread uniformly over the support. Upon drying the desired lamination is obtained.

So also a still further modification of the process may be employed. A sheet of polyvinyl alcohol may be heated so that it is softened. It may be then stretched to substantially orient the molecules of the sheet. The stretched sheet may then be brought into direct contact with the glass support with enough water between the sheet and support to insure uniform contact and to wet the surface of the sheet. The assembly may then be heated to a temperature of approximately 175° C. until the dichroic alteration product known as polyvinylene is formed in the sheet of polyvinyl alcohol. After the lamination has cooled and the tension on the sheet has been removed, it will be found that a firm bond has been secured between the polyvinyl alcohol sheet and the glass support. All such modifications of the invention are to be deemed to fall within its scope.

So also, while the invention has been described specifically in connection with the use of a light-polarizing sheet comprising polyvinyl alcohol, it is to be understood that other light-polarizing sheets may be employed, for example vinylic compounds, such as polyvinyl acetal containing oriented molecules of polyvinylene.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. A lamination comprising a glass sheet having bonded thereto, by an adhesive comprising polyvinyl alcohol, a light polarizing layer comprising a vinylic resin containing substantially oriented molecules of polyvinylene.

2. A lamination comprising, as successive layers, a glass sheet, a layer of polyvinyl alcohol substantially free from dichroic molecules, and a layer of polyvinyl alcohol containing substantially oriented molecules of a dichroic alteration product of polyvinyl alcohol.

3. A lamination comprising, as successive layers, a glass sheet, a layer of polyvinyl alcohol substantially free from dichroic molecules, a layer of polyvinyl alcohol containing substantially oriented molecules of a dichroic alteration product of polyvinyl alcohol, and a layer comprising a transparent protective resin, said first named layer of polyvinyl alcohol bonding together said glass sheet and said second named layer of polyvinyl alcohol, and said resin layer adhering to said second named layer of polyvinyl alcohol.

4. A lamination comprising, as successive layers, a glass sheet, a layer of polyvinyl alcohol substantially free from dichroic molecules, a layer of polyvinyl alcohol containing substantially oriented molecules of a dichroic alteration product of polyvinyl alcohol, and a layer comprising Polymerin, said first named layer of polyvinyl alcohol bonding together said glass sheet and said second named layer of polyvinyl alcohol, and said Polymerin layer adhering to said second named layer of polyvinyl alcohol.

5. A lamination comprising, as successive layers, a glass sheet, a layer of polyvinyl alcohol substantially free from dichroic molecules, a layer of polyvinyl alcohol containing substantially oriented molecules of a dichroic alteration product of polyvinyl alcohol, and a layer comprising a transparent protective resin adapted substantially to block ultraviolet radiation, said first named layer of polyvinyl alcohol bonding together said glass sheet and said second named layer of polyvinyl alcohol, and said resin layer adhering to said second named layer of polyvinyl alcohol.

6. A lamination comprising a plurality of glass elements having sandwiched therebetween and bonded thereto a light-polarizing sheet comprising a vinylic compound containing hydrocarbon long straight-chain molecules having extended systems of conjugated double bonds, the lamination also comprising bonding material comprising polyvinyl alcohol.

7. A lamination comprising a pair of glass sheets, a film of polyvinyl alcohol adherent to the inner face of each glass sheet, and a light-polarizing layer intermediate the polyvinyl alcohol layers and adhered thereto, said light-polarizing layer comprising polyvinyl alcohol containing oriented molecules of polyvinylene.

8. A lamination comprising a sheet of glass having a curved surface, and a light-polarizing layer comprising a vinylic resin containing oriented molecules of polyvinylene conforming in shape to and bonded to said curved surface by an adhesive comprising polyvinyl alcohol.

9. A lamination comprising a glass sheet and a sheet of light-polarizing material comprising oriented molecules of polyvinylene bonded thereto by a cement comprising water-resistant polyvinyl alcohol.

10. A process comprising coating a surface of a glass sheet with a film of polyvinyl alcohol, applying a sheet of light-polarizing material comprising a vinylic resin containing oriented molecules of a dichroic alteration product of polyvinyl alcohol to said coated surface while maintaining the surface of contact between said polarizing sheet and said coating wet, and drying the assembled elements.

11. A process comprising coating a surface of a glass sheet with a film of polyvinyl alcohol, applying a sheet of light-polarizing material comprising a vinylic resin containing oriented molecules of a dichroic alteration product of polyvinyl alcohol to said coated surface while maintaining the surface of contact between said polarizing sheet and said coating wet, and drying the assembled elements by heating at a temperature such that said polyvinyl alcohol coating is rendered water resistant.

12. The process of forming a light-polarizing lamination which comprises coating a supporting element with a thin film of polyvinyl alcohol, pressing said coated element into engagement with a light-polarizing sheet comprising polyvinyl alcohol containing oriented molecules of polyvinylene, moistening the contacting surfaces, and drying the moistened surfaces to effect a permanent bond.

13. The process of forming a light-polarizing lamination which comprises coating a supporting element with a thin film of polyvinyl alcohol, moistening a light-polarizing film comprising a vinylic resin containing oriented molecules of polyvinylene, pressing said moistened film and the coated surface of said supporting element together, and drying said film while holding it in contact with said surface.

14. The process of forming a light-polarizing lamination which comprises coating a supporting element with a thin film of polyvinyl alcohol, moistening a light-polarizing film comprising a vinylic resin containing oriented molecules of polyvinylene by applying thereto an aqueous solution of sodium chloride, stretching said moistened film, pressing said moistened film and the coated surface of said supporting element together, and drying said film while holding it in contact with said surface.

15. The process comprising softening a sheet of polyvinyl alcohol, stretching said sheet to substantially orient its molecules, pressing said sheet against a moistened surface of a sheet of glass, and heating said sheet while maintaining it in stretched condition to form therein a dichroic alternation product of polyvinyl alcohol and to dry the contacting surfaces of said sheet and said glass whereby a bond is effected therebetween.

HOWARD G. ROGERS.

CERTIFICATE OF CORRECTION.

Patent 2,263,249.  November 18, 1941.

HOWARD G. ROGERS.

It is hereby certified that error appears in the printed specification of the above numbered patent requiring correction as follows: Page 3, second column, line 60, claim 15, for "alternation" read --alteration--; and that the said Letters Patent should be read with this correction therein that the same may conform to the record of the case in the Patent Office.

Signed and sealed this 27th day of January, A. D. 1942.

(Seal)
Henry Van Arsdale,
Acting Commissioner of Patents.